United States Patent
Moore, Jr.

[15] 3,698,676
[45] Oct. 17, 1972

[54] ASSEMBLY FOR STRUCTURAL FRAMING UNIT

[72] Inventor: Junius T. Moore, Jr., Charlestown, W. Va.

[73] Assignee: The Moore Company, Charleston, W. Va.

[22] Filed: July 27, 1970

[21] Appl. No.: 58,636

[52] U.S. Cl. ................................................. 248/317
[51] Int. Cl. ............................................. F16m 13/00
[58] Field of Search .............. 248/214, 317, 320, 340; 191/40; 52/39, 484, 706, 709, 710

[56] References Cited

UNITED STATES PATENTS

| | | | |
|---|---|---|---|
| 1,561,126 | 11/1925 | Timm | 52/710 X |
| 1,866,539 | 7/1932 | Bonsall | 52/39 X |
| 2,771,615 | 11/1956 | Horowitz | 248/317 X |
| 2,962,253 | 11/1960 | Moore | 248/320 |
| 3,430,909 | 3/1969 | Webb | 248/317 |

*Primary Examiner*—William H. Schultz
*Attorney*—Cushman, Darby & Cushman

[57] ABSTRACT

An improved framing unit assembly for carrying suspended loads is described. The assembly includes an elongate frame member which is essentially hollow with a channel opening defined along one side, together with a bolt means which can be received within the hollow space of the frame member to reinforce the frame member when loaded. The bolt means includes a middle section which is shaped to fit within the channel opening of the frame member so as to prevent collapse of the member in the region of its channel.

7 Claims, 2 Drawing Figures

PATENTED OCT 17 1972  3,698,676

INVENTOR
JUNIUS T. MOORE, JR.

BY Cushman, Darby & Cushman
ATTORNEYS

ASSEMBLY FOR STRUCTURAL FRAMING UNIT

BACKGROUND AND BRIEF DESCRIPTION OF INVENTION

This invention relates to improvements in elongate framing units of the type which can be assembled together to support loads, and the invention is especially concerned with framing units which are intended for use in installations in which loads can be suspended downwardly therefrom.

It is known in the art to form frame members from metal stock material which has been shaped to define a hollow structure having three closed sides and an open channel side. Such frame members are more economical than are comparable solid framing units, and they offer certain advantages in ease of installation and assembly of a number of like members to make up overhead framing structures.

Also, it is known to install such U-shaped frame members in inverted positions for the purpose of suspending loads therefrom. Such a use is contemplated by the lockerbasket installations described in my U. S. Pat. Nos. 2,620,074 of Dec. 2, 1952 and 2,962,253 of Nov. 29, 1960.

Additional prior art on this subject is represented by the disclosures in U. S. Pat. Nos. 2,990,458; 3,055,469; 3,190,604; and 3,430,909.

Frame members of the type discussed above have an inherent weakness in the region of their channel opening, and certain load conditions can cause the frame member to collapse through a movement or distortion of wall sections which define opposite sides of the channel opening. The present invention provides for a substantial reinforcement of such channel-type frame members through the use of a bolt means which can be assembled with the frame member to form a reinforcement across the channel region thereof. The bolt means is of such a structure as to prevent collapse of the U-shaped frame member, and the assembly of a frame member with the bolt means of this invention results in a framing unit having characteristics that approach those of a closed tube. This reinforcement is accomplished without fully closing the channel opening of the frame member, and thus, the basic installation and handling advantages offered by such members are not impaired.

In its basic form, the invention comprises a framing unit assembly made up of a novel combination of a channel-section frame member with a novel bolt means which reinforces the frame member. The frame member is provided with aligned openings through opposite side walls which define opposite sides of the channel opening of the frame member, and the bolt means is inserted through a pair of such aligned openings so as to be connected to the frame member. The bolt means is of a sufficient length to span the hollow interior space of the frame member, and further, the bolt means has a middle section which extends into the channel opening of the frame member to prevent a collapse of the frame member.

In a specific embodiment of the invention, the frame member channel is defined by inwardly turned marginal edges of stock material shaped to form the entire frame member. The bolt means is provided with shoulder portions which can contact the inwardly turned marginal edges of the channel to prevent a collapse of the frame member in the channel region. Further, the middle section of the bolt means functions as a load carrying device for suspending loads from the frame unit assembly. A typical installation would connect a pulley or other load carrying device to the middle section of the bolt means.

These and other features and advantages of the invention will become apparent in the more detailed discussion which follows, and in that discussion reference will be made to the accompanying drawings as briefly described below.

DETAILED DESCRIPTION OF INVENTION

Figure 1:
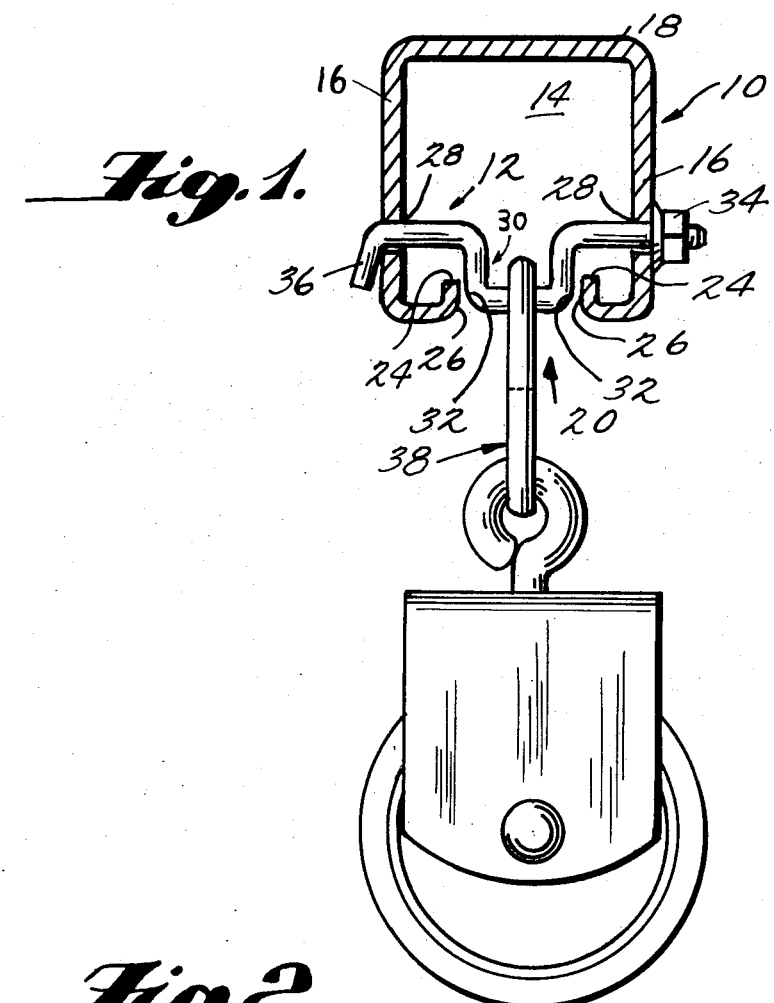
FIG. 1 is an end elevational view, partly in cross-section, of the framing unit assembly of the present invention with a load carrying device connected thereto.

Referring to the drawings, the structural framing unit of the present invention comprises a combination of two basic parts. A first part is an elongate frame member 10, and the second part is a bolt means 12.

The elongate frame member 10 is essentially U-shaped in cross-section (as viewed in the end elevational view of FIG. 1, the frame member is shown in a typical inverted attitude for installation on an overhead support surface) to define a hollow space 14 therein. The illustrated frame member 10 is rectangular in cross-section and is formed from metal stock material which has been shaped to define side walls 16 and a connecting wall 18. Thus, three sides of the hollow frame member are closed, and a fourth side is left substantially open so that an elongate channel opening 20 is defined therein. Frame members of this type offer a number of advantages for load carrying uses. They are lightweight and easily handled; they are economical to manufacture; and they can be easily secured together or to other structural units to form overhead assemblies for supporting loads. Typical installations provide for a securement of such framing members to overhead structural units by the use of fastening devices which pass through openings (not shown) in their connecting wall portions 18. Other installation arrangements are also used. A number of such elongate frame members can be connected together to make up desired sizes and shapes of structural framing units. FIG. 2 illustrates the use of a splicing insert member 22, which fits within the hollow space 14 of the frame member 10, for splicing frame members 10 together in end-to-end relationships.

Figure 2:
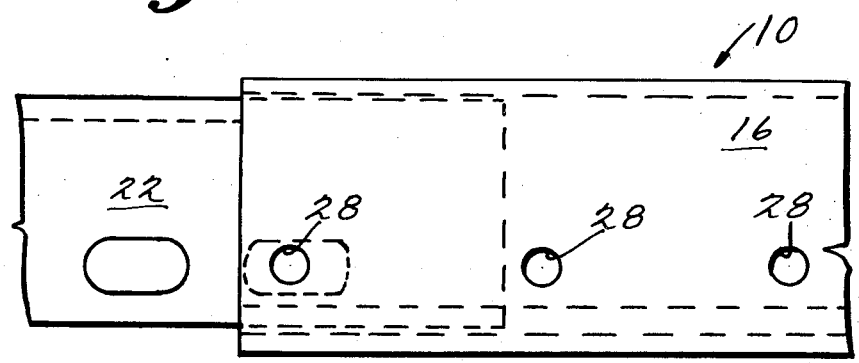
FIG. 2 is a side elevational view of a frame member used in the assembly of the present invention.

Frame member 10 which is illustrated in FIG. 1 is formed with marginal edges 24 of the stock material from which it is made turned inwardly into the hollow space 14 to define the channel opening 20. This provides shoulder areas 26 along the length of each side of the channel 20 for cooperation with the bolt means 12.

As shown in FIG. 1, the bolt means 12 is of a sufficient length to completely span the hollow space 14 within the frame member when the bolt means is inserted through opposite side walls 16 of the frame member. The side walls 16 are provided with aligned openings 28 for receiving opposite ends of the bolt means 12. The bolt means 12 is shaped to provide a middle section 30 which can be received within the open channel 20 of the frame member. In the relative positions shown in FIG. 1, the middle section 30 extends downwardly into the region of channel 20 and across the width of channel 20 so that shoulder portions 32 of the bolt means can contact the marginal shoulders 26. The FIG. 1 illustration shows the shoulders 26 and 32 out of respective contact, but this is mainly for purposes of clarity. An actual assembly can provide for slight contact when the middle section 30 of the bolt means is turned downwardly into the channel 20 during assembly of the bolt means with the frame member 10. Alternatively, there can be provided a slight clearance between the respective shoulders 26 and 32, as illustrated. Either way, the function of the middle section 30 is primarily one of reinforcing the frame member 10 by bracing the channel region from inward collapse when loaded. In this sense, the bolt means 12 changes the basic characteristic of the frame member 10 from that of an open-sided channel member to that of a close tube. Furthermore, it accomplishes this without actually closing off very much of the channel space.

The bolt means 12 is provided with fastening means for preventing its accidental removal or dislodgment from the frame member 10 once it is installed. In the illustrated embodiment, one end of the bolt means is threaded so that a fastening nut 34 can be secured onto the portion of the threaded end which extends outside of the frame member 10. The opposite end of the bolt means is provided with a down-turned portion 36 which limits movement of the bolt means into the channel member 10. Alternatively, both ends of the bolt means 12 can be provided with threads or other known fastening devices, if desired.

The bolt means 12 is installed in the frame member 10 by inserting its straight, threaded end into one of the openings 28 provided in the frame member 10. Then, the bolt means is twisted and moved while it is being inserted so that the leading threaded end can be inserted through an opposite, aligned opening 28. Next, the middle section 30 of the bolt means is turned (downwardly in the FIG. 1 arrangement) to be fitted within the channel opening 20 of the frame member 10. When the bolt means 12 is used for suspending loads from the frame member 10, a load carrying means, such as link 38, is placed over the threaded end of the bolt means as the bolt means is being moved through the frame member 10. This is done before the threaded end is received into a second opening 28 of the frame member 10. To complete the installation, a nut 34 is threaded onto the protruding threaded end of the bolt means 12 to fasten the assembly together.

It can be seen from the above that the bolt means 12 can function as a device for suspending loads from a frame member as well as a means for reinforcing the frame member. The middle section 30 of the illustrated embodiment, provides for suspension of a link and pulley arrangement from the bolt means while also providing for a reinforcement of the channel region of the frame member 10.

Having described a preferred embodiment of the present invention, it will be appreciated that a very useful assembly is provided by this invention. Frame members 10 can be made up as integral structures, as described; or alternatively, they can be assembled from component parts. Any number of openings 28 may be punched or formed through opposite walls of the frame members so that bolt means 12 can be inserted at preferred load carrying locations. Also, bolt means 12 can be inserted in other places where collapse of the frame member 10 is to be prevented. It will become apparent to those skilled in this art that the embodiment discussed herein can be changed to provide fully equivalent structures and functions. Such changes are intended to be included within the scope of this invention, as claimed below.

What is claimed is:

1. An improved assembly for forming a structural framing unit, comprising the combination of:
    an elongate frame member made from stock material which is formed to define side walls and a connecting wall as an integral formation which is essentially U-shaped in cross-section so as to define a hollow space therein, with one side of the frame member being substantially open to form a channel as defined by marginal edges of said stock material being turned inwardly into said hollow space, and said elongate frame member having openings formed in aligned positions through wall sections on opposites sides of the channel, and
    a bolt means for reinforcing said frame member, said bolt means being sufficiently long to span the hollow space defined within the frame member when the bolt means is inserted through a pair of said aligned openings, and said bolt means having a middle section which is shaped to include shoulder portions disposed between the inwardly turned marginal edges of said frame member for preventing a collapse of the frame member in the region of its open channel.

2. The assembly of claim 1 wherein said bolt means includes fastening means for preventing accidental removal of the bolt means from the frame member after the bolt means is inserted through a pair of said aligned openings of the frame member.

3. An improved framing unit assembly from which a load can be suspended, comprising the combination of:
    an elongate frame member which has a cross-section that is essentially in the form of an inverted U when the frame member is connected to other structural units for carrying loads, thereby providing for a downwardly directed channel opening in the installed frame member, and
    a bolt means received within said frame member to reinforce the frame member and to provide a means for suspending loads from the frame member, said bolt means being of a sufficient length to span a hollow interior space of the frame member, and said bolt means having a downwardly extending middle section which fits into the channel opening of the frame member to prevent a collapse of the frame member in the region of said channel opening.

4. The assembly of claim 3 wherein said frame member is formed from stock material that is shaped to define said inverted U, and wherein marginal edges of said stock are turned inwardly to define opposite edges of said channel opening.

5. The assembly of claim 4 wherein said frame member is provided with aligned openings through side walls on each side of its channel opening for receiving opposite ends of said bolt means.

6. The assembly of claim 5, and including fastening means for securing said bolt means relative to said frame member.

7. The assembly of claim 6, and including load carrying means connected to said middle section of said bolt means for suspending a load from said frame member.

* * * * *